United States Patent [19]

Kosak et al.

[11] 4,421,332
[45] Dec. 20, 1983

[54] INDIVIDUAL WHEEL SUSPENSION FOR NON-STEERED WHEELS OF MOTOR VEHICLES, ESPECIALLY AUTOMOBILES

[75] Inventors: Werner Kosak, Dachau; Wolfgang Matschinsky, Munich, both of Fed. Rep. of Germany

[73] Assignee: Bayerische Motoren Werke, Fed. Rep. of Germany

[21] Appl. No.: 321,606

[22] Filed: Nov. 16, 1981

[30] Foreign Application Priority Data

Nov. 14, 1980 [EP] European Pat. Off. ........ 80107072.3

[51] Int. Cl.³ .............................................. B60G 3/00
[52] U.S. Cl. .................................. 280/95 R; 280/701; 280/690; 280/713; 280/725; 280/726; 180/73 TL
[58] Field of Search ............... 280/95 R, 96, 660, 663, 280/698, 673, 701, 675, 690, 96.3, 713, 725, 726; 180/73 TL

[56] References Cited

U.S. PATENT DOCUMENTS

| | | | |
|---|---|---|---|
| 3,093,390 | 6/1963 | Müller | 280/663 |
| 3,163,440 | 12/1964 | Vail | 280/690 |
| 3,693,746 | 9/1972 | Yamamoto | 180/73.4 |
| 3,694,000 | 9/1972 | Van Winsen | 180/73.4 |
| 3,876,029 | 4/1975 | Ohe | 280/690 |
| 4,245,853 | 1/1981 | Inone | 280/701 |
| 4,354,567 | 10/1982 | Puchas | 280/690 |

FOREIGN PATENT DOCUMENTS

| | | | |
|---|---|---|---|
| 2440506 | 3/1976 | Fed. Rep. of Germany | 180/73.4 |
| 1505697 | 1/1979 | Fed. Rep. of Germany | 180/73.4 |

*Primary Examiner*—Robert R. Song
*Attorney, Agent, or Firm*—Craig & Burns

[57] ABSTRACT

An individual wheel suspension for a non-steered wheel of a motor vehicle, such as an automobile, is disclosed. The suspension comprises a trailing arm, connected with the vehicle body in an articulated fashion by means of a lengthwise arm disposed in the direction lengthwise of the vehicle and, in the direction transverse to the vehicle, by means of two wishbones, one located above the other, whereby the wishbones form auxiliary tie-rods in a transverse plane running vertically through the wheel center, the extensions of the tie-rods, directed toward the center of the vehicle, intersecting at a transverse pole located at a distance from the wheel center plane. The auxiliary tie-rods, with their articulations at the wheels are provided in the vicinity of the wheel center plane at an auxiliary distance from the transverse pole whereby the wishbones each form an auxiliary tie-rod with a length which is shorter than or approximately equal to half the auxiliary distance. The lengthwise is disposed so that it points toward the rear of the vehicle, with an articulation of the lengthwise arm to the vehicle body being located near the wheel center plane and beneath the center of the wheel.

6 Claims, 3 Drawing Figures

INDIVIDUAL WHEEL SUSPENSION FOR NON-STEERED WHEELS OF MOTOR VEHICLES, ESPECIALLY AUTOMOBILES

The present invention relates to an individual wheel suspension for a non-steered wheel of a motor vehicle such as an automobile comprising a trailing arm, connected with the vehicle body in an articulated fashion by means of a lengthwise arm disposed in the direction lengthwise of the vehicle and, in the direction transverse to the vehicle, by means of two wishbones, one located above the other, whereby the wishbones form auxiliary tie rods in a transverse plane running vertically through the wheel center, the extensions of said tie rods, directed toward the center of the vehicle, intersecting at a transverse pole located at a distance from the wheel center plane.

An individual wheel suspension of this type is described in the journal ATZ 73 (1971), pages 248–250, under the subject of spherical wheel suspensions. The design data given include, among others, the camber "$\gamma$", the desired change in camber "$\Delta\gamma$" of the wheel when the spring is compressed, and the transverse polar distance "q" which is linked to the desired change in camber "$\Delta\gamma$" as follows:

$$q = 1/\Delta\gamma$$

From this relationship, we obtain for a small change in camber "$\Delta\gamma$" over a spring travel "f" (at the wheel), relatively large for comfort reasons, a relatively large transverse polar distance:

$$q = f/\Delta\gamma$$

An object of the present invention is to establish a relationship between a relatively large transverse polar distance, resulting from the above relationship, and the lengths of the auxiliary tie rods, of a wheel suspension of the aforementioned type, by which a desired roll steering behavior of the wheel in the individual wheel suspension is achieved during spring travel.

A further object of the invention is to provide an easily installed arrangement of the lengthwise arm and wishbones for an individual wheel suspension of the aforementioned type, with an essentially positive toe-in behavior of the wheel as the spring is compressed and extended.

These and other objects of the invention are attained by providing an individual wheel suspension of the aforementioned type wherein the auxiliary tie rods, with their articulations at the wheels are provided in the vicinity of the wheel center plane at an auxiliary distance from the transverse pole whereby the wishbones each form an auxiliary tie rod with a length which is shorter than or approximately equal to half the auxiliary distance, and in that the lengthwise arm is disposed so that it points toward the rear of the vehicle, with an articulation of the lengthwise arm to the vehicle body being located near the wheel center plane and beneath the center of the wheel.

One advantage of the invention is that in a powered or nonpowered rear axle, with wheels suspended individually according to the invention, there is more space available for installing a fuel tank to be mounted beneath the back seat as well as a depressed trunk floor in front of the axles or half-axles. A second advantage is that of a favorable toe-in behavior as the wheel goes up and down, with a desirably small change in camber to reduce the tire load. In this manner, an understeering to neutral steering behavior is achieved with a rear axle of this type.

By an appropriate choice of wishbone lengths, from auxiliary tie rods of equal length to upper auxiliary tie rods which are much shorter than the lower auxiliary tie rods, any desired positive toe-in curve can be achieved advantageously and can be rocked relative to the wheel axis by selecting the position of the articulation.

Furthermore, the limiting case can be achieved by the invention, in which the wheel with the suspension according to the invention undergoes no change in toe-in as the spring is compressed and extended. This is accomplished by using auxiliary tie rods, each of which has a length which corresponds to half the auxiliary distance, as well as an articulation in the lengthwise arm which is disposed on a parallel-to-the-wheel axis which passes through the transverse pole, viewed in the direction of travel. With the lengthwise arm articulation located beneath the axle, with the lengthwise arm pointing rearward according to the invention, the additional advantage of a progressive elimination of squat is achieved.

According to a further feature of the invention both wishbones are essentially disposed rearward of the transverse plane or wheel axle which permits the area of the vehicle floor ahead of the axle or, in powered wheels, ahead of the half-axles to be optimally shaped.

Further, in a disclosed preferred embodiment of the invention the lower wishbone, as seen in top view, is disposed essentially parallel to the transverse plane and/or the wheel axle and comprises a support for a spring and a vibration damper means such as a spring or shock absorber unit near the trailing arm, whereby the upper wishbone is shorter than the lower wishbone and is carried past diagonally to the transverse plane on the axle side with respect to the spring and the vibration damper means, with an articulation on the vehicle side which is in the transverse plane. With this arrangement the lower support of the spring and the vibration damper means or spring/shock absorber unit is located advantageously low so that it can have its upper end abut the vehicle floor. This permits narrow wheel housings and a relatively wide trunk, without sharp creases. The relationship of the lengths of the wishbones to the lengths of their auxiliary tie rods, according to the invention, permits the upper wishbones to be disposed in a space-saving manner.

An additional feature of the invention involves rotationally movably disposing a braking stop means on the trailing arm concentrically with respect to the wheel axle. The braking stop means is connected with the vehicle body by a supporting strut which is disposed in such manner that it is directed forward and downward in the direction of forward travel of the vehicle. This permits elimination of dive with the individual wheel suspension according to the invention.

These and other objects, features and advantages of the present invention will become more apparent from the following description when taken in connection with the accompanying drawings, which show for purposes of illustration only, one embodiment in accordance with the present invention.

Figure 1:
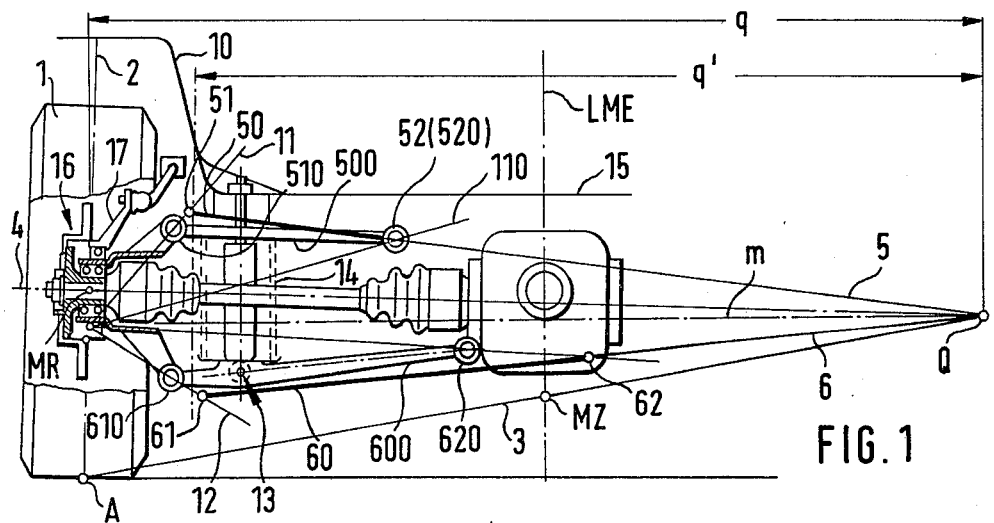
FIG. 1 shows a transverse cross section for an individual wheel suspension according to the invention.

In the transverse cross section of FIG. 1, a wheel 1 with negative camber is shown, not to scale. A line 3, on whose extension through MZ transverse pole Q lies, runs from the contact point A of wheel center plane 2 of wheel 1 through the instantaneous center MZ drawn at a predetermined height through vehicle lengthwise central plane LME. The distance q between transverse pole Q and wheel center plane 2 in the middle of wheel MR is determined from the spring travel "f" measured at the wheel, made relatively large, to provide comfortable springing, and a desired small change in camber $\Delta\gamma$ during spring travel, according to the relationship $q = f/\Delta\gamma$.

FIG. 1 shows a distance q, measured from transverse pole Q at the intersection of line 3 with the extended wheel axis 4. A transverse plane 40 is shown passing through this wheel axis 4 in the lengthwise cross section and top view, the plane 40 passing vertically through the middle of wheel MR and on which transverse pole Q lies. In the transverse cross section, lines 5 and 6 run from transverse pole Q approximately to the edge of a wheel rim (not shown) of wheel 1. An auxiliary tie rod 50 is supported on upper line 5 and an auxiliary tie rod 60 is supported on lower line 6. Auxiliary tie rods 50 and 60 are located, together with their articulations 51 and 61, on the wheel side, near wheel 1 or wheel center plane 2 at an additional distance q' which is determined from transverse pole Q. Additional distance q' approximately corresponds to the transverse polar distance q, but can be larger if wheel 1 is differently shaped. Auxiliary tie rod 50 is shorter than q'/2, while auxiliary tie rod 60 has a length of approximately q'/2.

The wheel is connected with a trailing arm 7 which is firmly connected to a lengthwise arm 8 located in the direction lengthwise of the vehicle. Lengthwise arm 8 is articulated to the vehicle body 10 by an articulation 9. The articulation 9, viewed in the direction of travel as indicated by arrow "F", is located behind axle 4 in wheel center plane 2 below the center of wheel MR.

From articulation 9, lines 11 and 110 run to the articulations 51 and 52 of upper auxiliary tie-rod 50, located in transverse plane 40, and lines 12 and 120 run to articulations 61 and 62 of lower auxiliary tie rod 60 located in transverse plane 40. It follows from the top view (FIG. 3) that wishbones 500 and 600, supporting trailing arms 7 in the direction transverse to the vehicle on vehicle body 10, with their articulations 510 and 610 at the wheels, are disposed on the corresponding lines 11 and 12 and their articulations 520 and 620 on the body side are disposed on the corresponding lines 110 and 120. It also follows from FIGS. 1 and 2 that upper wishbone 500 has its articulation 510 at the wheel above axis 4 and lower wishbone 600 has its articulation 610 at the wheel below axle 4 at trailing arm 7.

Wishbones 500 and 600, viewed in the direction of travel "F", are located behind transverse plane 40 and/or axle 4 and are therefore located, together with articulation 9, on one side of axle 4 and/or transverse plane 40. As is apparent from FIG. 3, lower wishbone 600 is located parallel to axle 4, and has a support 13 for a spring/shock absorber unit 14 near trailing arm 7. Unit 14 has its upper end fastened in a flat area of the vehicle or trunk floor 15. Upper wishbone 500 is carried past from its articulation 510 at the wheel to transverse plane 40 in the direction of travel "F", diagonally forward to the spring/shock absorber unit 14, while articulation 520 at the body end is in transverse plane 40.

Figure 2:
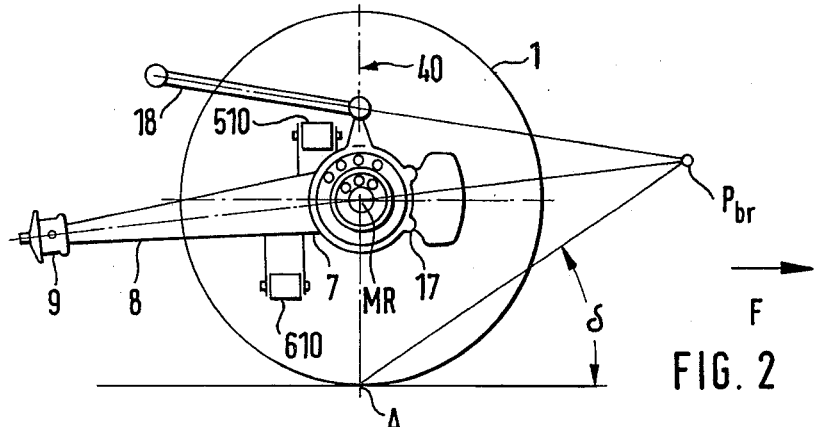
FIG. 2 shows a lengthwise cross section thereof.
Figure 3:
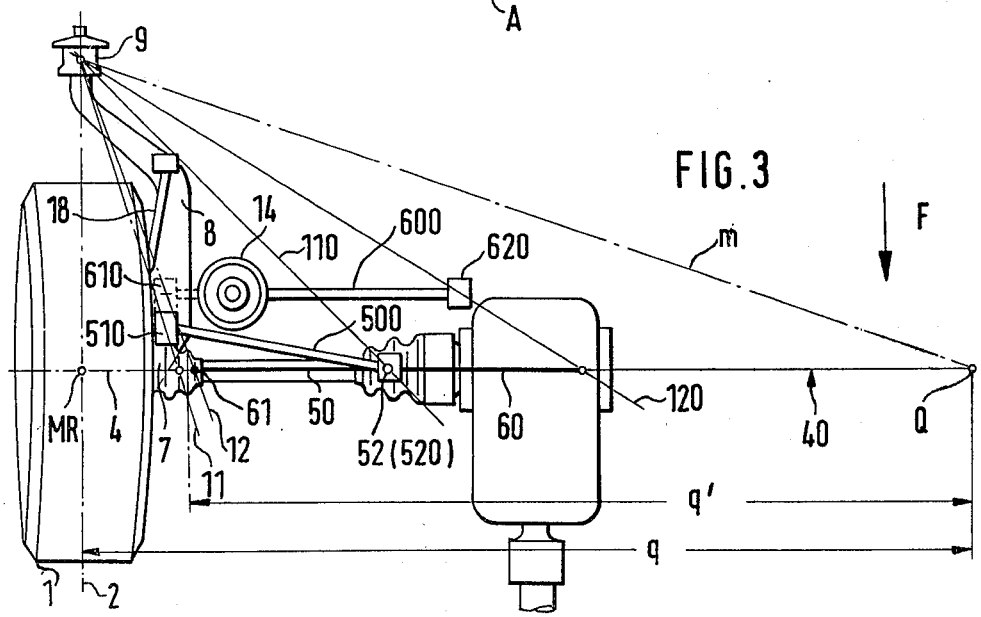
FIG. 3 shows a top view thereof.

The lengthwise cross-section (FIG. 2) clearly shows the position of lengthwise arm articulation 9 below the middle of wheel MR and/or below axle 4. The arrangement of articulation 9 eliminates squat. To achieve an anti-drive effect with the brake device associated with wheel 1, a brake stop 17 is disposed rotationally movably on trailing arm 7, concentrically to axle 4, and, as can be seen from FIG. 2, is connected with vehicle body 10 by a support strut 18 which is so arranged that it runs forward and downward at an angle in the direction of travel "F".

The line of application of strut 18 and of lengthwise arm 8 and/or trailing arm 7 intersect at braking pole $P_{br}$ from which the angle $\delta$ about wheel support point A is determined.

Articulation 9 is designed as an elastic bearing. In order to suppress an elastic steering of wheel 1 when a lengthwise force, such as braking or accelerating force, occurs at wheel 1, articulation 9 is disposed in wheel center plane 2. This permits a relatively soft elastic bearing for lengthwise springing of wheel 1. Furthermore, articulation 9 can also be designed as an elastic bearing with different spring hardnesses in mutually different directions, in order to achieve a desired toe-in behavior of wheel 1 in response to lengthwise or lateral forces, with the desired lengthwise springing of wheel 1. Such a bearing is especially advantageous in the case of an articulation 9 located outside wheel center plane 2, whereby a favorable elastokinematic articulation of the individual wheel suspension is achieved.

To achieve a desired toe-in behavior of wheel 1 with lengthwise springing with an elastic bearing for articulation 9 of the type or types described above, both wishbones 500 and 600 can also be disposed ahead of axle 4 or transverse plane 40 or on both sides, looking in the direction of travel. In the case of the wishbone arrangement according to the embodiment described above and articulation 9 disposed in wheel center plane 2, with a simple, relatively soft elastic bearing, an understeering elastic countersteering is achieved with lateral force applied to wheel 1 on the outside of the curve. The instantaneous axis m of individual wheel suspension is a straight line running through articulation 9 and transverse pole Q.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. An individual wheel suspension for a non-steered wheel of a motor vehicle, such as an automobile, comprising a trailing arm, connected with the vehicle body in an articulated fashion by means of a lengthwise arm disposed in the direction lengthwise of the vehicle and, in the direction transverse to the vehicle, by two wishbone means, one located above the other, whereby each of the wishbone means includes auxiliary tie-rod means projecting in a transverse plane running vertically through the wheel center, the extension of said tie-rods, directed toward the center of the vehicle, intersecting at a transverse pole located at a distance from the wheel center plane, characterized in that the articulation of the end of each of the auxiliary tie-rod means proximate the wheel are provided in the vicinity of the wheel center plane at an auxiliary distance from said transverse pole whereby each of the auxiliary tie-rod means is of a length which is shorter than or approximately equal to half the auxiliary distance, and in that the lengthwise arm is disposed so that it points toward the rear of said vehicle, with an articulation of the lengthwise arm to the vehicle body being located near the wheel center plane and beneath the center of the wheel.

2. An individual wheel suspension according to claim 1, characterized in that both wishbone means are essentially disposed rearward of said transverse plane or wheel axle.

3. An individual wheel suspension according to claim 2, characterized in that the lower wishbone, as seen in top view, is disposed essentially parallel to said transverse plane and/or said wheel axle and comprises a support for a spring and a vibration damper means near said trailing arm, and wherein the upper wishbone is shorter than the lower wishbone and is carried past diagonally to the transverse plane on the axle side with respect to the spring and the vibration damper means, with an articulation on the vehicle side which is in the transverse plane.

4. An individual wheel suspension according to claim 1, 2, or 3, characterized in that a braking stop means is disposed rotationally movably on said trailing arm concentrically with respect to the wheel axle, and is connected with the vehicle body by a supporting strut which is disposed in such manner that it is directed forward and downward in the direction of travel of said vehicle.

5. An individual wheel suspension according to claim 4, characterized in that the auxiliary distance roughly corresponds to the transverse polar distance.

6. An individual wheel suspension according to claim 1, 2, or 3, characterized in that the auxiliary distance roughly corresponds to the transverse polar distance.

* * * * *